TRANSLATING APPARATUS AND FOLLOW-UP SYSTEM

Filed April 2, 1949 4 Sheets-Sheet 1

INVENTOR.
Robert Adler
BY Hiess Olson & Mecklenburger
Att'ys

Jan. 29, 1952 R. ADLER 2,583,535

TRANSLATING APPARATUS AND FOLLOW-UP SYSTEM

Filed April 2, 1949 4 Sheets-Sheet 2

INVENTOR.
Robert Adler
BY
Thiess, Olson & Mecklenburger
Att'ys

TRANSLATING APPARATUS AND FOLLOW-UP SYSTEM

Filed April 2, 1949 4 Sheets-Sheet 3

INVENTOR.
Robert Adler
BY
Thiess, Olson & Mecklenburger
Att'ys

INVENTOR.
Robert Adler
BY
Thiess, Olson & Mecklenburger
Attys

Patented Jan. 29, 1952 2,583,535

UNITED STATES PATENT OFFICE 2,583,535

TRANSLATING APPARATUS AND FOLLOW-UP SYSTEM

Robert Adler, Chicago, Ill., assignor to Consolidated Electric Company, Chicago, Ill., a corporation of Illinois Application April 2, 1949, Serial No. 85,236

13 Claims. (Cl. 178—19)

This invention relates to mechanical translating apparatus wherein the motions of two sources or means are translated into the motion of a single member or receiver, and it is an object of the invention to provide improved apparatus of this character.

One form of apparatus wherein mechanical translating means embodying the invention finds particular application is tele-autographic apparatus. In such apparatus handwriting at a transmitting station is resolved into two components in accordance with some coordinate system by a linkage mechanism which connects a writing stylus to each of a pair of signal generators. A signal corresponding to each component is generated, for example, D. C. voltages of varying amplitudes or A. C. voltages of varying frequency, and both signals are transmitted to a receiving station where each signal causes a component motion to be generated which corresponds to the respective component at the transmitter. These component motions are composed or translated into the single motion of a receiving stylus by a linkage mechanism which connects the stylus to the receiving motion generators or sources.

To reproduce the handwriting accurately at the receiving station, it is essential that each component motion be reproduced without having the reproduction thereof affect the other component motion. That is, each component motion should be reproduced as if the other were not present. This may be visualized by assuming that, at the transmitter, the stylus is made to follow a path so that only one coordinate signal is varied, i. e. stylus movement takes place along only one coordinate axis. Hence, only one of the two signals is altered at the receiver, and movement of the stylus thereat should take place along only the one coordinate axis. There should be no motion induced along the other coordinate axis. Since the linking mechanism joins the two sources of motion to the stylus, there is a linkage connection or mechanical coupling from one source of motion to the other whereby there is a tendency, in prior art apparatus, for motion of one source to induce motion into the other source. This tendency exists even though the lengths of the various links are so designed that they can move properly without mechanically interfering with each other, and may be traced to an effect which has been termed mutual mass coupling.

Accordingly, it is a further object of the invention to provide an improved linkage mechanism between two sources of motion and a single member wherein there is zero mutual mass coupling between the sources of motion.

The problem to which the present invention is a solution arises because the links have weight or mass and thus exert forces or reactions of their own when they are accelerated in moving from one point to another. If the motions are slow so that the accelerations involved are very low, each source may move without affecting the other. That is to say, the problem exists only where the motions include substantial transient components as is the case in handwriting movements, for example. If the links could be made of zero mass while retaining their rigidity, making systems with zero mutual mass coupling would present no special problems. However, since the links have mass, mutual forces or torques are generally set up between the links in prior art apparatus.

Accordingly, it is a further object of the invention to provide an improved linkage mechanism between two sources of motion and a single member or receiver wherein the resultant of forces or torques, tending to produce motion of one source when the other source is accelerated, are zero.

It is a further object of the invention to provide a tele-autographic receiver with an improved linkage system between the writing stylus and the two sources of component motion wherein there is zero mutual mass coupling between the sources of motion.

In a copending application of Robert Adler entitled Improvements in Follow-up Apparatus and Systems, filed April 4, 1949, having Serial No. 85,354 and assigned to the same assignee as the present invention, there are described and claimed follow-up systems, particularly tele-autographic and telemetric systems utilizing a linkage mechanism for translating the motion of two sources into the single motion of a stylus wherein the transient response of the receiving apparatus is much improved over prior art apparatus. The improvement is effected through the application of a force which is proportional to the acceleration or second time derivative of the transmitted positioning signal. A secondary positioning correction force obtained from the positioning signal, either directly or through a servo mechansm, is applied to prevent errors from accumulating over a period of time.

Apparatus such as described in the foregoing pending application provide substantially perfect transient response where a single source of motion is concerned. But, where two sources of motion are linked together, transient response of equal perfection is only obtained if there is no mutual mass coupling therebetween, since otherwise the two sources will react or interfere with each other.

A linkage system having no mutual mass coupling between the sources of motion will have improved transient response to applied signals over prior art apparatus because of the lack of mutual interference between the sources. But, unless a force proportional to the second time derivative of the transmitted positioning signal is applied thereto, the transient response thereof is no better than that of a follow-up system having a single source of motion and utilizing a conventional servo mechanism for positioning. The application of a positioning force proportional to the second time derivative of the transmitted positioning signal to a linkage system of two sources of motion having zero mutual mass therebetween produces in the latter system the same accuracy of transient response as is produced in a follow-up system having a single source of motion and utilizing a second time derivative or acceleration signal.

Accordingly, it is a further object of the invention to provide apparatus, wherein the motions of two sources of motion are translated into the motion of a single receiver through the application of forces proportional to the acceleration (i. e. the second time derivative) of a transmitted signal, having improved transient response.

Accordingly, it is a further object of the invention to provide apparatus, wherein the motions of two sources of motion are translated into the motion of a single receiver through the application of forces proportional to the acceleration (i. e. the second time derivative) of a transmitted signal, having zero mutual mass coupling between the two sources of motion.

In carrying out the invention in one form, mechanism for translating the motions of two sources into motions of one receiver is provided comprising, a pair of links connecting to said sources and having a common pivotal axis, further links connected between the pair of links and the receiver forming essentially a parallelogram of links, and the masses of the further links arranged with respect to coordinates X, Y, which are defined by the parallelogram and originate in the pivotal axis, according to the law $\Sigma MXY=0$.

In carrying out the invention in another form there is provided, in a follow-up system wherein the motions of a pair of follow-up members are combined into the motions of a single receiver, the apparatus comprising, means for controlling the motions of each one of a pair of follow-up members in accordance with the second time derivative of the transmitted positioning signal, and a linkage between said receiver and said follow-up members wherein the mutual moment of inertia is reduced to zero.

For a more complete understanding of the invention, reference should be had to the accompanying drawings in which.

Figures 1, 8:
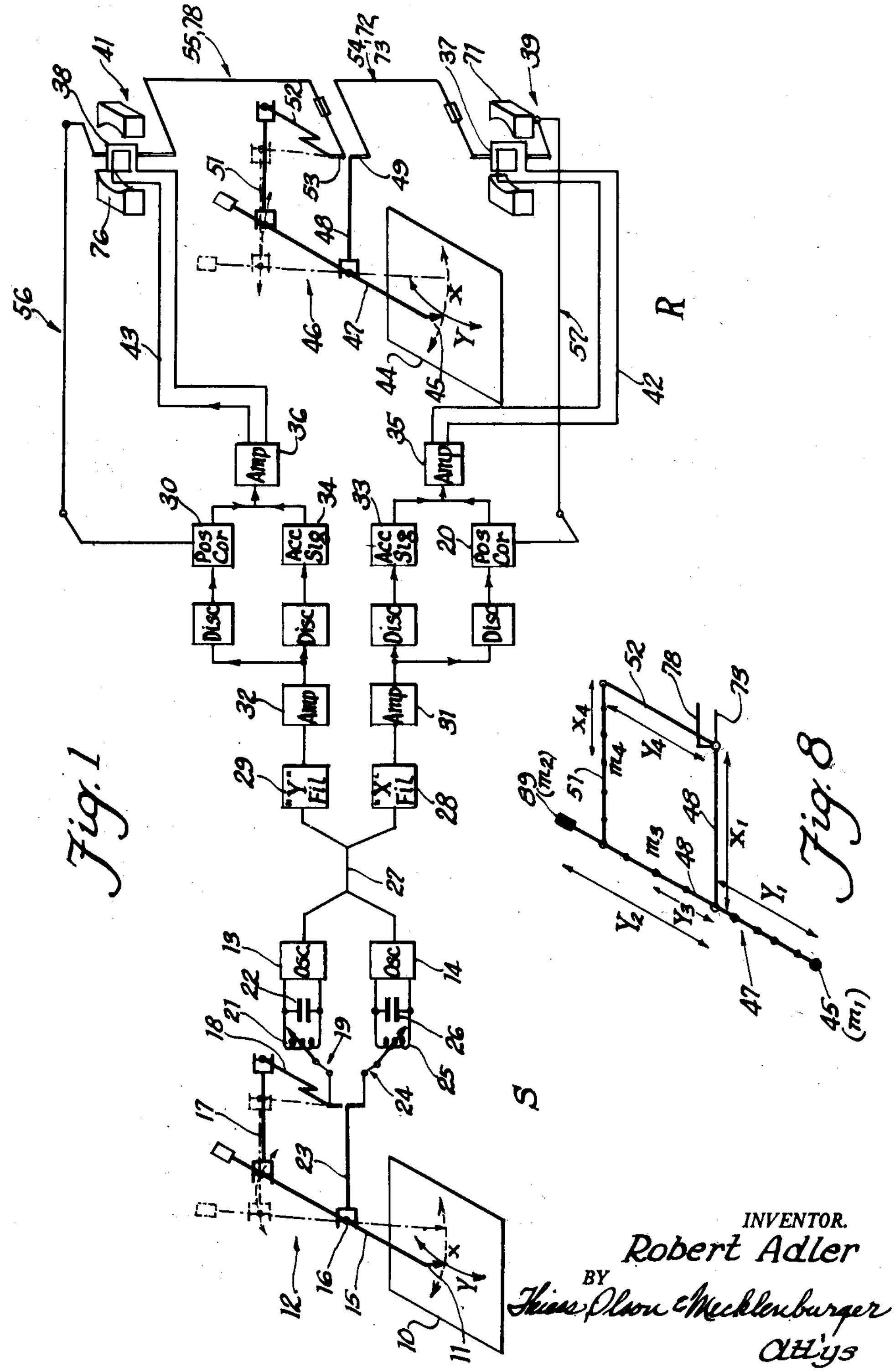
Figure 1 is a diagrammatic view of a tele-autographic system utilizing apparatus embodying the invention.
Fig. 8 is a diagrammatic view of the linkage mechanism of Fig. 6.
Figure 2:
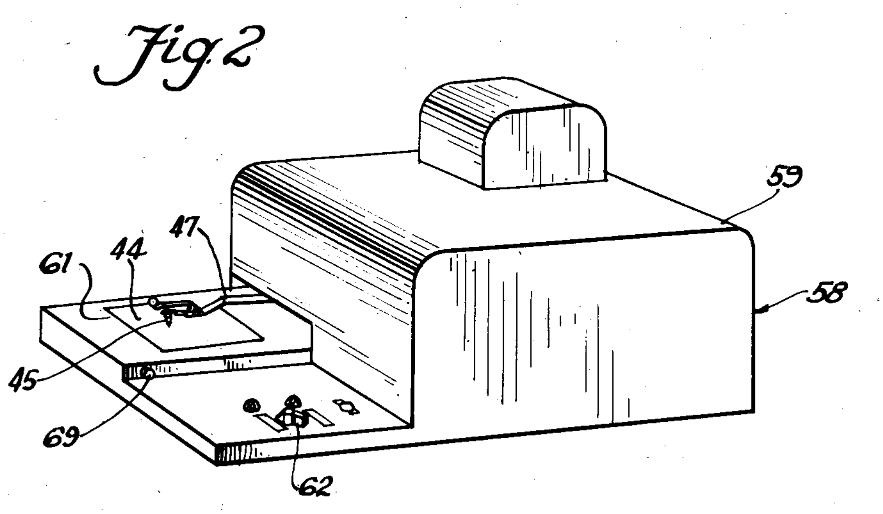
Fig. 2 is a view in perspective of a tele-autographic receiver shown diagrammatically in Fig. 1.
Figure 3:
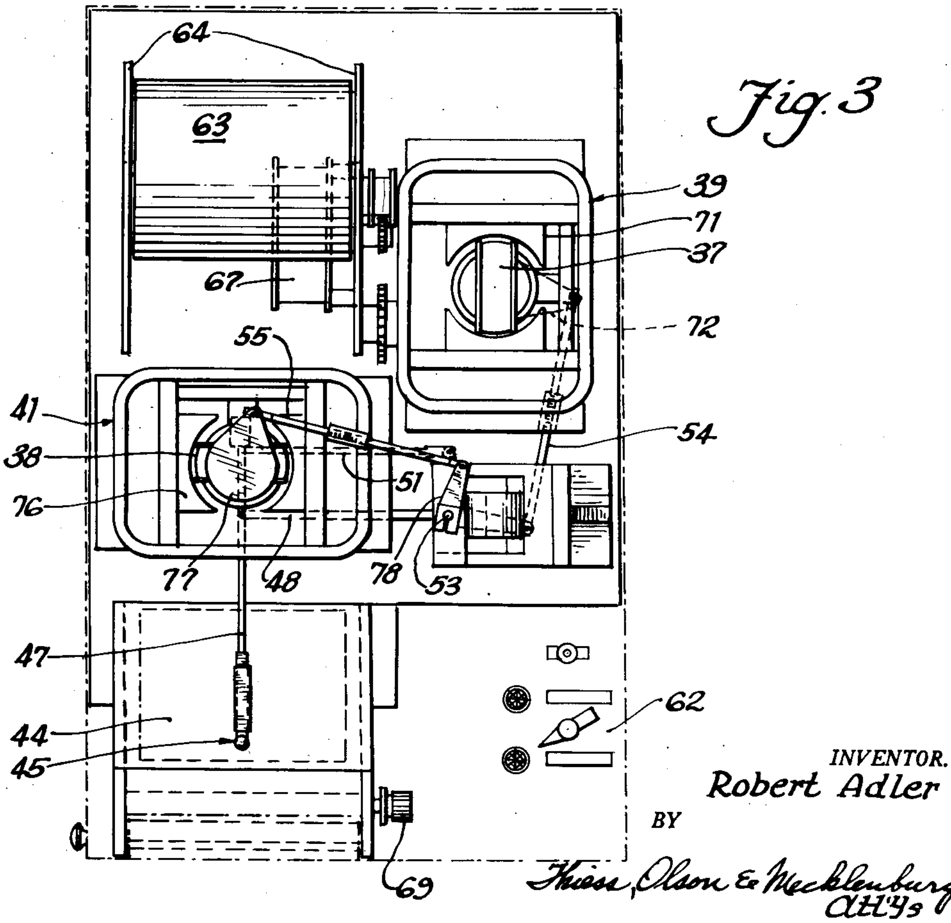
Fig. 3 is a top plan view of the receiver shown in Fig. 2 with cover removed.
Figure 4:
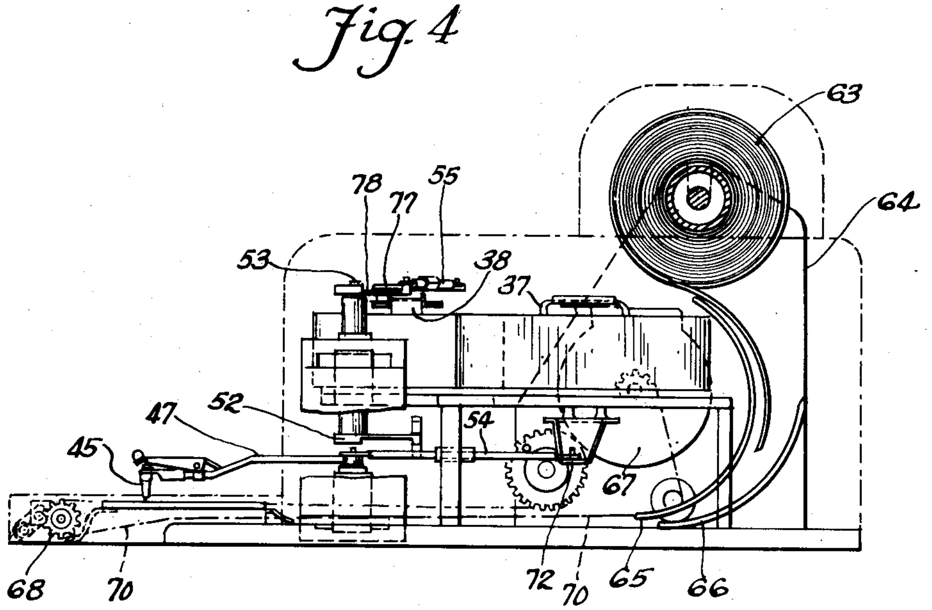
Fig. 4 is a side elevational view thereof.
Figure 5:
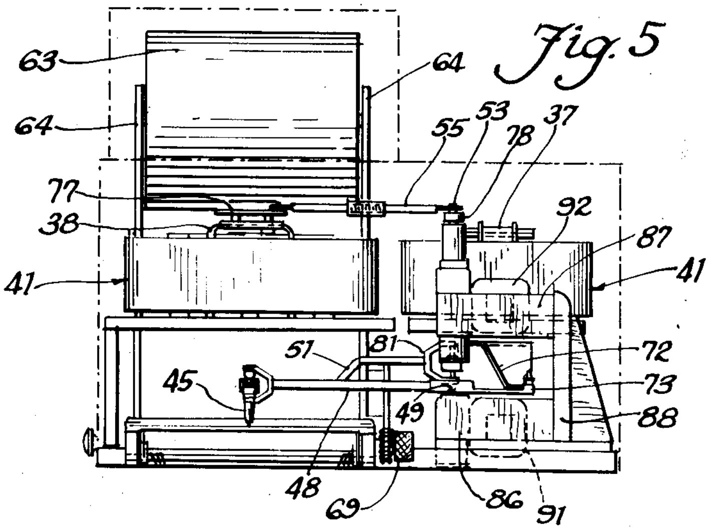
Fig. 5 is a front elevational view thereof.

Referring to the drawings, there is shown in Fig. 1 a tele-autographic system including a transmitting or sending station S and a receiving station R which utilizes voltages of varying frequencies for transmitting the handwriting or similar intelligence. It will be understood that duplicate equipment may be provided at each station in order that transmission may take place in either direction.

The sending station may comprise a writing surface 10, a stylus 11, a linkage mechanism 12, and a pair of oscillators 13 and 14, the linkage mechanism connecting the stylus to the oscillator frequency determining circuits.

Writing surface 10 may have points within it designated by coordinates taken along the X and Y coordinate axes. Motions of stylus 11 along the X coordinate axis occur when pivot 16 remains stationary and arm 15 of the linkage mechanism pivots about pivot 16, thereby causing oscillator 13 to generate a voltage having frequencies corresponding to such motions. These motions are transmitted through arm 15, link 17, driving arm 18, and linkage mechanism 19 to the adjusting arm of a variable inductor 21 which, together with condenser 22, forms the frequency determining circuit of oscillator 13. Motions of stylus 11 along the Y coordinate axes occur when arm 15 does not rotate about pivot 16 but moves only in translation; that is, parallel to itself at all times, such motions causing only oscillator 14 to generate a voltage of varying frequency. Such motions of stylus 11 are transmitted through driving arm 23 and linkage mechanism 24 to the adjusting arm of a variable inductor 25 which, together with condenser 26, forms the frequency determining circuit of oscillator 14.

The voltages of varying frequencies generated by oscillators 13 and 14 in response to movements of the stylus are transmitted over the transmission line 27 or by wireless, for example, to the receiving station R. At the receiving station the voltages of varying frequency are separated into the appropriate channels by X and Y filters 28 and 29. After amplification in suitable amplifiers 31 and 32, the signals are supplied to acceleration signal networks 33 and 34 and to positioning correction networks 20 and 30 through appropriate discriminators. For a detailed disclosure of these networks and their manner of operation, reference is made to the application Serial No. 85,354 hereinbefore referred to. From the acceleration signal networks, voltages are supplied to amplifiers 35 and 36 which supply actuating currents to coils 37 and 38 of galvanometric units, respectively, 39 and 41 through conductor pairs 42 and 43. The acceleration currents supply the primary positioning effort as pointed out in the application referred to and to this end the galvanometric units 39 and 41 are made as frictionless as possible, and amplifiers 35 and 36 may be of the vacuum tube variety for supplying the required power as a linear function of the applied signal. Secondary positioning correction voltages are obtained from networks 20 and 30 which may be error signal networks, and supplied to the amplifiers and thus to the galvanometric units.

The receiving station R further comprises a writing surface 44, points within which may be designated by coordinates along X and Y axes similar to the writing surface at the sending station, a stylus 45, and a linkage mechanism 46. Linkage mechanism 46 comprises an arm 47 carrying the stylus, a driving arm 48 pivoted at axis 49, and a link 51 pivoted to a driving arm 52 mounted on an axis 53. The axes 49 and 53 are collinear with each other and are connected, respectively, to the moving coils 37 and 38 of the galvanometric movements by links 54 and 55, shown schematically. Connected to the shaft of coil 38, there is a linkage mechanism 56 connected to a variable element in position correction network 30 to provide the local effect in the error signal generated therein. Likewise, shaft of coil 37 is connected through a linkage mechanism 57 to a variable member of position correction network 28.

Positioning correction network 30 produces an output D. C. voltage which is proportional to the instantaneous mismatch between the frequency of the incoming voltage and the condition of a local circuit determined by the position of the coil 38 and hence of stylus 45. Likewise, positioning correction network 33 generates a D. C. voltage proportional to the instantaneous mismatch occurring in the apparatus for this coordinate.

The positioning correction networks 28 and 30 may, for example, be of the character described more completely and claimed in an application of Robert Adler entitled Improvement in Follow-up Apparatus and Systems, Serial No. 81,709, filed March 16, 1949, and assigned to the same assignee as the present invention. It will be understood that the positioning correction networks may supply the full positioning force for stylus 45 without the presence of the acceleration signal network if so desired.

With the apparatus as thus briefly described, it will be clear that motions of stylus 11 at the transmitting station cause voltages having frequencies corresponding thereto to be generated, which are transmitted to station R where the galvanometric units 39 and 41 cause corresponding motions of stylus 45 to occur.

Referring more particularly to Figs. 2, 3, 4 and 5, the receiver at station R may be seen best in one form of practical arrangement. It will be understood that an identical device may be arranged at the sending station in order that transmitting and receiving may take place in either direction.

Receiver 58 embodies the mechanical aspects of the receiving station therein and comprises a framework with the various components mounted thereon, a cover 59 being arranged thereover. The forward portions thereof may be divided conveniently into two parts 61 and 62, the portion 61 defining the writing surface 44 and portion 62 defining an area wherein a suitable operating switch and indicating lights, for example, may be mounted. Galvanometric units 39 and 41 may be mounted as shown substantially in the same plane by any suitable mounting means and adapted by linkage including linkage mechanism 46, to be more particularly described, to drive stylus 45 by means of arm 47. Also adapted to be carried on the receiver frame is a roll of paper 63 carried by a pair of side members 64 as shown. Paper from roll 63 may be fed between sides 65 and 66 of a chute (Fig. 4) to extend forwardly over writing surface 44. A motor 67 is suitably arranged to drive the paper forwardly whenever desired, this being accomplished by means of a chain 70 to a sprocket 68 arranged at the forward end of the receiver, the sprocket driving a suitable roller. A thumb nut 69 may be arranged on the shaft of the roller in order that the paper may be advanced by hand, if so desired.

Figures 6, 7:
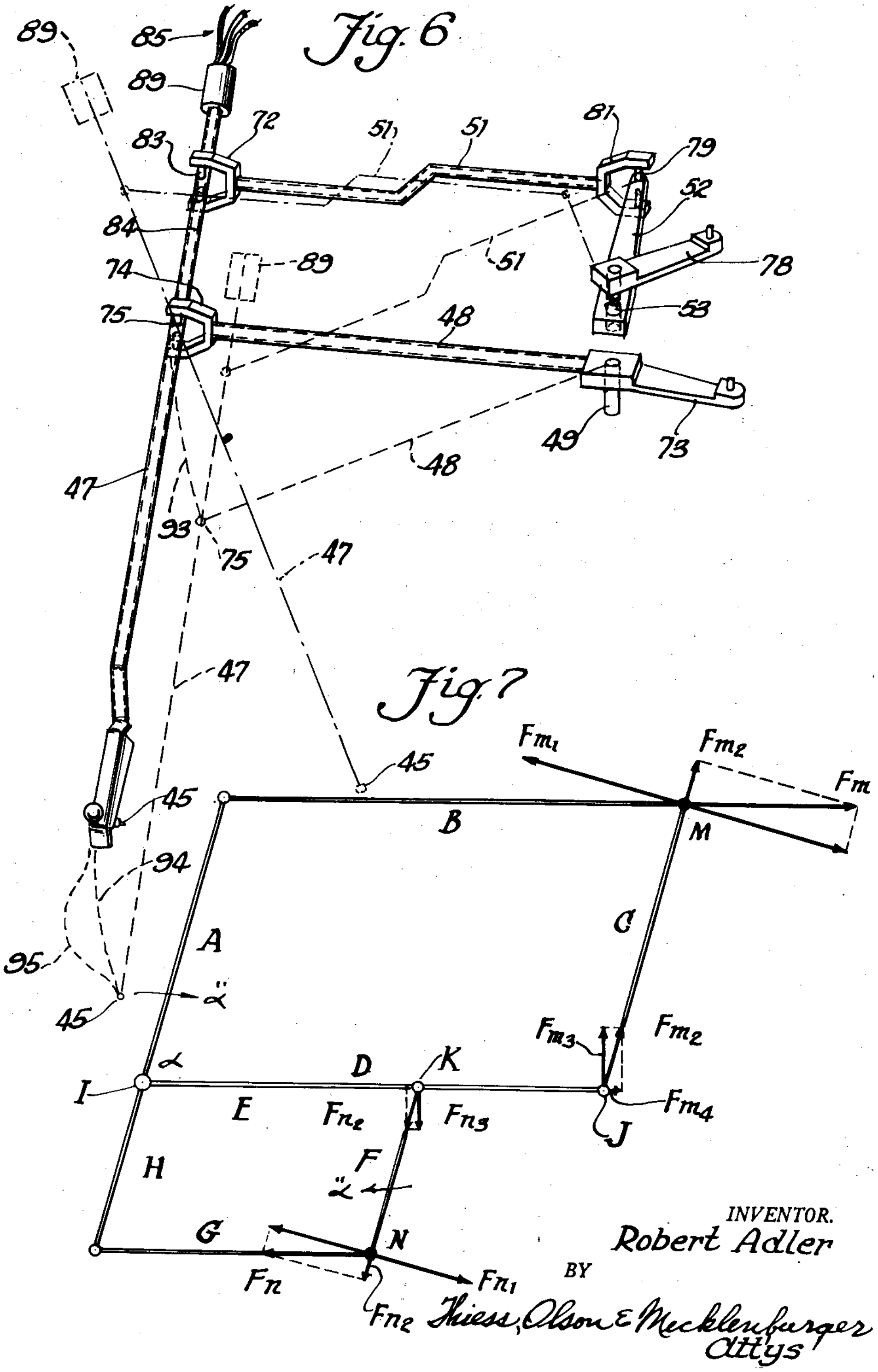
Fig. 6 is a perspective view on a larger scale of the linkage mechanism shown in the preceding figures and embodying the invention.
Fig. 7 is a diagrammatic view of a generalized linkage mechanism for explaining the invention.

Galvanometric unit 39 comprises a pair of permanent magnets having pole pieces 71 creating a magnetic field within which coil 37, mounted upon suitable bearings, is adapted to rotate. Attached to the lower end of coil 37 is an arm 72 at one end of which the link 54 is pivoted, the other end of link 54 being pivotally connected to an arm 73 which is pivoted at axis or shaft 49. Extending from arm 73 is the driving arm 48 which is pivoted to arm 47 by means of a yoke 74 and pins 75 (Fig. 6).

Similarly, galvanometric unit 41 comprises a pair of permanent magnets having pole pieces 76 creating a magnetic field within which coil 38, mounted upon suitable bearings, is adapted to rotate. Attached to the upper end of coil 38 is an arm 77 at one end of which is pivoted link 55, the other end of link 55 being pivotally connected to an arm 78 which is connected to one end of shaft or axis 53 so that motions of arm 78 cause rotations thereof. The other end of shaft 53 is connected to one end of a driving arm 52 whereby motions of arm 78 cause motions of arm 52. The other end of arm 52 is connected through pins 79 to a yoke 81 from which extends link 51. The other end of link 51 is connected to a yoke 82 which in turn is connected by means of pins 83 to arm 47.

The length of driving arm 48 between the centers of shaft 49 and pin 75 is the same as the length of link 51 between the centers of pins 79 and 83. Correspondingly, the length of driving arm 52 between the centers of shaft 53 and pin 79 is the same as the portion 84 of arm 47 between the centers of pins 75 and 83. The axis of shaft 49 and the axis of shaft 53 are collinear with each other. Accordingly, driving arms 48 and 52, together with link 51 and portion 84, form a parallelogram, with the respective opposite sides always remaining parallel to each other irrespective of the relative positions of driving arms.

The pivots at the junctions between the various arms and links are made as frictionless as possible. Arms 47 and 48 and link 51 may be made of hollow tubing, as shown, in order to reduce the mass of these members to a minimum while still retaining the necessary rigidity. Driving arm 48 may be somewhat stronger than the other arms inasmuch as this arm may be made to carry the weight of the linkage as a whole. In order to insure motion of stylus 45 in a well-defined horizontal plane, yokes 74, 82 and 81 are relatively wide and the bearings for shafts 49 and 53 may be relatively wide as may be visualized from Figs. 4 and 5, these bearings being rigidly supported by the horizontal members 86 and 87 attached to a vertical member 88 which in turn is attached to the base of the receiver.

Conductors 85 may extend through arm 47 for connection with the stylus 45.

Associated with shaft 49 is a coil 91, and associated with shaft 53 is a coil 92, these coils forming part of the variable inductors controlled by the shafts respectively for controlling the error signal networks, as described in the application referred to.

As indicated previously in this specification, it is essential that motions of one driving arm do not reflect or induce any motion into the other driving arm. Thus, for example, if galvanometric movement 39 receives a current and turns, arm 48 should rotate about shaft 49, but link 52 should remain stationary. In this instance, referring to Fig. 6, arm 47 moves translationly only (no rotation about pin 75) and assumes a position parallel to itself, shown dotted. Likewise, if galvanometric movement 41 receives a current and turns, arm 78, and thus arm 52 should rotate about shaft 53, but arm 48 should remain stationary. In this instance (Fig. 6), arm 47 moves pivotally only about pin 75 and assumes a position shown by dot-dash lines.

In order that these movements may occur, the masses of the various arms must be chosen, as will be more clearly pointed out, so that the torques acting on arm 48 are zero when arm 52 is given an impulse to turn and the torques on arm 52 are zero when arm 48 is given an impulse to turn.

These conditions may be stated in the form that for either driving arm $\Sigma T=0$ (summation of torques equals zero) when the other arm is accelerated.

According to the invention, these conditions are met by a specified distribution of masses. An understanding of how masses linked together may produce counterbalancing forces or torques such that motions of one arm will not induce torques into another, may be facilitated by referring to Fig. 7 where two masses M and N are arranged in a general linkage mechanism, as shown. The mass M is pivotally mounted at one corner of a parallelogram consisting of arms A, B, C and D pivoted at their junctions, as shown. Likewise, mass N is pivoted at one corner of a parallelogram consisting of arms E, F, G and H pivoted at their junctions, as shown. Arms A and H are rigid with each other, that is, are portions of the same arm and form one driving arm pivoted at I, arm D forming the other driving arm also pivoted at I.

To facilitate analysis of the linkage system shown, the following idealized conditions are assumed: The pivots are frictionless; the arms D and AH are mounted on the same pivot I which is rigidly mounted relative to some reference frame; masses M and N are point masses; all arms are rigid and the masses thereof are negligible. That is, the only masses in the system are M and N.

It is assumed, in the first instance, that arm D remains stationary and that arm AH is given an angular acceleration $\ddot{\alpha}$ in the direction shown about pivot I, the angle between arms A and E being designated as $\alpha$. Since the arms are connected in the form of a parallelogram, arm C will have the same angular acceleration about pivot J as arm A about pivot I. It will now be shown that the torques acting on arm D may be made to add up to zero, i. e. $\Sigma T=0$, if the masses M and N and the lengths of the various arms bear a certain relationship to each other.

Acceleration of arm A in the direction shown causes arm B to exert a force $F_M$ on mass M. Force $F_M$ is in the direction of arm B inasmuch as the pivots between arms A, B and C are frictionless. In the absence of friction force $F_M$ is consumed in accelerating mass M, but since arm D is assumed stationary, mass M must travel along a circle having radius C and center J. Accordingly, at the instant illustrated, the force $F_M$ may be resolved into two components, one at right angles to arm C which tends to accelerate mass M, and another in line with arm C. Mass M, of course, resists acceleration by exerting an appropriate reaction force $F_{M1}$ along the tangent to the circle having center J; this force is equal and opposite to the component of $F_M$ along this tangent. Force $F_{M1}$ being at right angles to arm C tends only to resist rotation thereof about pivot J and thus exerts no torque on arm D. The other component force $F_{M2}$, however, being directed along arm C does exert a force on arm D. The force $F_{M2}$ transferred to pivot J may again be resolved into two components, one at right angles to arm D, $F_{M3}$, and one in line therewith, $F_{M4}$. $F_{M4}$, being in line with arm D, produces only tension therein and does not tend to rotate it. $F_{M3}$, being at right angles to arm D, tends to produce rotation thereof in the direction of $F_{M3}$. It may be shown by the principles of resolution of forces into components that $F_{M3}$, due to the acceleration $\ddot{\alpha}$ of arm A, is equal in magnitude to $M\ddot{\alpha}C \cos \alpha$ and the torque due thereto, $T_{M3}$, has a magnitude of $M\ddot{\alpha}CD \cos \alpha$ and tends to produce counterclockwise rotation of arm D.

Proceeding now to consider mass N, since the arms joining mass N to the system are formed as a parallelogram, arm F experiences the angular acceleration $\alpha$ when arm A is given the same acceleration, the movement of arm F being clockwise in direction. Proceeding similarly as for mass M, arm G exerts a force $F_N$ in line therewith which is resolved into two components. One component tends to accelerate mass N along a circle having arm F as a radius and pivot K as a center. The reaction to the acceleration of mass N is a force $F_{N1}$ which is at right angles to arm F and only resists rotation thereof along the tangent to the circle of radius F and thus produces no torque on arm D. The other component $F_{N2}$ of the original force $F_N$ exerts a tension in arm F which is transmitted thereby to the pivot K. Again, at pivot K, $F_{N2}$ may be resolved into two components, one, $F_{N4}$, lying along the direction of arm D and producing only internal stresses therein with no tendency for rotation, and another, $F_{N3}$, tending to produce clockwise rotation of arm D. $F_{N3}$ may be shown to be equal in magnitude to $N\ddot{\alpha}F \cos \alpha$, and the torque $T_{N3}$ due thereto has a magnitude equal to $N\ddot{\alpha}FE \cos \alpha$. This torque tends to produce a clockwise rotation of arm D. For arm D to remain stationary, $\Sigma T=0$, or the torques $T_{M3}$ and $T_{N3}$ must be equal to each other in magnitude, and tend to produce rotations in opposite directions.

By inspection of Fig. 7, it is seen that these torques oppose each other. Hence, the relationship $\Sigma T=0$ for the instant case becomes $M\ddot{\alpha}CD \cos \alpha - N\ddot{\alpha}FE \cos \alpha=0$. Treating this algebraically there is obtained the relationships $MCD=NFE$.

By assuming that arm A is stationary and that arm D is given an acceleration, it will be found that the same relationship is obtained.

It is apparent that, under the assumed parallelogram linkage arrangement, the torque produced by any mass M and exerted on one arm when the other arm is accelerated, is of the form $T=M\ddot{\alpha}XY \cos \alpha$ where X and Y are the coordinates of the mass taken in the direction of the sides of the parallelogram. Hence the relationship may be written $$\Sigma M\ddot{\alpha}XY \cos \alpha=0 \text{ or } \Sigma MXY=0$$

In other words, the sum total of the products of all masses in the system and their respective coordinate pairs must be zero.

From the laws of dynamics, it is known that for a rotary system with a single degree of freedom, $T=I\ddot{\alpha}$ where T is torque, I is moment of inertia of a mass relative to the axis of rotation, and $\ddot{\alpha}$ is the angular acceleration of the mass about the axis. In this case, $\alpha$ and T refer to the same single degree of freedom which the system possesses, and the moment of inertia I is the factor of proportionality therebetween.

In the more complex system treated in the foregoing analysis, there exist two rotary coordinates or degrees of freedom. As was shown before, angular acceleration $\alpha$ of one coordinate will produce in the other coordinate a torque equal to $T=\alpha\Sigma MXY \cos \alpha$. For a given position of the linkage, corresponding to a certain angle $\alpha$, the acceleration $\alpha$ in one coordinate is proportional to the torque T appearing in the other, with a factor of proportionality $I_M=\Sigma MXY \cos \alpha$ existing therebetween.

The factor $I_M$ is therefore analogous to a moment of inertia. Because it denotes the mutual interaction between two coordinates, it may properly be termed the moment of mutual inertia therebetween.

Hence the condition for producing no torque on one arm when another arm is accelerated may be stated thus: The total moment of mutual inertia between the two arms must be zero.

It will be apparent that masses distributed along the lengths of the arms do not change the laws derived and can be analyzed in the foregoing fashion, this involving only a problem of integration. It is desirable, however, that the masses have no substantial dimensions laterally inasmuch as this would tend to destroy the parallelogram relationship. For the laws derived to be strictly correct, it is necessary that the coordinates of any small particle of mass never change as the arms are rotated. That is, its coordinates X and Y measured parallel to the links must always remain the same.

The masses M and N, during acceleration, acquire velocities and thus set up centrifugal forces having components which exert torques on arm D. These can be shown, by an analysis similar to that already made, to result in the same requirement $MCD=NFE$.

The analysis given relative to the sketch of Fig. 7 for a general arrangement of masses may be applied to the specific linkage construction of Fig. 6. In this arrangement, arms 48 and 52, being the driving arms, form the coordinate axes and the coordinates of masses along arm 47 and link 51 are referred thereto. By a proper selection of the weight of these arms, as determined from the relationship given, the sum total of the products of all the masses and their coordinates taken with due regard to sign, may be made to add up to zero. Inasmuch as arm 47 and link 51 may be made relatively light, the greater portion of the mass may be concentrated in the stylus holding structure at the forward end of arm 47 and a balancing mass 89 at the rear end of arm 47. However, since arm 47 and link 51 do have some weight distributed along their lengths, weight 89 is dimensioned with this in mind.

In Fig. 8 there is shown a schematic representation of Fig. 6 showing the stylus construction at the forward end as a mass $m_1$ and the weight 89 at the rear end of arm 47 as a mass $m_2$. As is apparent from the analysis, the mass of driving arms does not enter into the analysis, since Y is zero everywhere along arm 48, and X is zero everywhere along arm 52. The distributed masses are shown as a series of small masses $m_3$, $m_4$ . . . distributed along the arms 51 and 47.

The law of $\Sigma MXY=0$, applied to this figure, requires that $$m_1X_1Y_1+m_2X_1Y_2+m_3X_1Y_3+m_4X_4Y_4+\ldots=0$$

(with due regard for signs) where $X_1$ and $Y_4$ are the lengths of the parallelogram sides and the remaining coordinates are as indicated. The coordinates of the masses are measured from the driving arms 48 and 52 and do not change with changes in position of these arms. Any consistent convention as to when the distances X and Y are negative and positive may be adopted. Thus directions downwardly from arm 48 may be negative and distances upwardly therefrom may be positive; distances to the left of arm 51 may be negative and distances to the right thereof may be positive similar to a conventional rectangular coordinate system. Following this there is obtained $$m_1X_1Y_1-m_2X_1Y_2-m_3X_1Y_3-m_4X_4Y_4=0$$

where the values are magnitudes only.

A better understanding of the invention may be had by considering an example of operation. Referring to Fig. 6, it may be assumed that arm 48 is accelerated by galvanometric unit 39 and that arm 52 is to remain stationary according to the invention. Thus pivot pin 75 moves to its dotted position along a circle 93 having a radius of the length of arm 48 and shaft 49 as a center. Correspondingly, the stylus end of arm 47 moves along a circle 94 having the same radius and a center at the intersection of imaginary parallelogram arms extending from shaft 49 and stylus 45.

However, if the linkage were not balanced as described, the stylus end of arm 47 would follow a curve such as 95 since the mass of link 51 could, at first, tend to resist movement more than necessary causing stylus 45 to move straight downwardly too far. This could cause arm 52 to pivot clockwise. With a positioning or follow-up system driving the linkage, the stylus will assume the correct position eventually but it will not have followed the proper path. A corresponding distortion would occur if arm 52 were accelerated and arm 48 were to remain stationary, except where a structure embodying the invention is utilized.

The unique cooperation between a linkage mechanism of the invention and a follow-up system utilizing forces proportional to acceleration may now be visualized more completely. If in the follow-up system, such as illustrated in Fig. 1, positioning forces are used which do not correspond to the accelerations required, the stylus 45 at the receiving station will lag behind or overshoot the stylus positions at the transmitting end, even though the zero mutual moment of inertia linkage is used. The fact that accelerations of one source do not cause accelerations of the second source does not alter this. It may be said that the driving torques are not of the proper character.

On the other hand, if proper acceleration torques are applied to both arms of the linkage, but mutual inertia exists therebetween, accelerations of one arm will induce undesired accelerations into the other arm and the resultant motion still have errors in it.

If, however, proper acceleration torques are applied to a linkage designed to have zero moment of mutual inertia, transients due to improper driving torques and those due to mutual interference of the arms in the linkage are both prevented. Hence, while the application only of proper acceleration forces produces improved results, there is still a transient error and while utilizing only a zero moment of mutual inertia linkage provides improved results there is also still a transient error; the combination according to the invention eliminates all transient error.

The combination of a linkage with zero moment of mutual inertia with a system in which driving forces proportional to the desired acceleration are utilized, results in another advantage which may now be explained. The proper operation of a follow-up system in which such driving forces are supplied presumes that the moment of inertia, in the conventional sense, of each follow-up member so driven remains constant. This condition is automatically fulfilled in the case of a single follow-up element having a single degree of freedom. It is, however, not necessarily met in linkages wherein the position of a receiver or stylus is determined by the composition of the motions of two independent follow-up elements.

In tele-autographic apparatus of the prior art, linkages have been used which violate the condition that the moment of inertia, in the conventional sense, of each individual follow-up element should remain constant irrespective of the position of the linkage. In such prior art apparatus, motion of one of the two follow-up elements results in such a re-arrangement of the masses that the individual moment of inertia of each of the two elements is altered. Application of forces proportional to the second time derivative of a positioning signal to such prior art apparatus may lead to improved performance if the amount of force applied is judiciously chosen so that it corresponds to the average moment of inertia of each follow-up element; but perfect transient response cannot be so obtained.

It can be shown that in any system with two coordinates or degrees of freedom wherein the moment of mutual inertia between the two coordinates is zero, the individual moments of inertia of each coordinate remain constant irrespective of any motions in either coordinate.

Tele-autographic apparatus embodying a linkage having zero moment of mutual inertia is therefore uniquely suited to be driven by a system which provides forces proportional to the desired acceleration, and the transient response of this combination may be rendered substantially perfect.

While the invention has been particularly described in connection with the tele-autographic apparatus, it will be understood that it has application to any system where motion from two sources is to be translated into motion of a single receiver.

While particular embodiments of the invention have been shown, it will be understood, of course, that the invention is not limited thereto since many modifications may be made, and it is, therefore, contemplated by the appended claims to cover any such modifications as fall within the true spirit and scope of the invention.

The invention having thus been described, what is claimed and desired to be secured by Letters Patent is:

1. Mechanism for translating the motions of two sources into motions of one receiver over a surface comprising, a parallelogram linkage system between said two sources and said receiver, said sources being connectible to a pair of the links of said system at a common pivotal axis thereof, the total moment of mutual inertia of all masses in said linkage system being zero for any position of said receiver on said surface.

2. A linkage system for translating the motions of two sources into motions of a single receiver comprising, a pair of links connected to said sources, said links having a common pivotal axis, further links connected between said pair of links and said receiver, portions of said pair of links and portions of said further links forming essentially a parallelogram of links, the mass of said further links and of said receiver and the coordinates thereof as defined by said parallelogram following the law $\Sigma MXY=0$.

3. Mechanism for translating the motions of two sources into motions of one receiver over a surface comprising, one arm having the receiver mounted thereon at one end, a first link connected at one of its ends to said arm, the other end of said first link being pivoted to one end of a first driving arm, and a second driving arm pivoted to said one arm intermediate the ends thereof, a counterbalancing mass near the other end of said one arm, said driving arms having a common pivot axis, said driving arms, said first link and the portion of said first arm between said second driving arm and said first link constituting a parallelogram.

4. A linkage system for translating the motions of two sources into motions of a single receiver over a surface comprising, a pair of links connected to said sources, said links having a common pivotal axis, further links connected between said pair of links and said receiver, portions of said pair of links and portions of said further links forming essentially a parallelogram of links, the mass of said further links and of said receiver and the coordinates thereof as defined by said parallelogram folowing the law $\Sigma MXY=0$ for all positions of said receiver over said surface.

5. A linkage system for translating the motions of two sources into motion of a single receiver comprising; a pair of members connectible to said sources; said members having a common pivot axis; a link connected to one end of one of said members, an arm having the receiver at one end linked to the ends of the other of said members and said link; said members on one side of said axis, said link and the portion of said arm between the ends of the other of said members and said link forming a parallelogram; a counterbalancing weight near the other end of said arm; the mass of said arm, said link, said receiver and said weight and the coordinates thereof as defined by said parallelogram following the law $\Sigma MXY=0$.

6. A linkage system for translating the motions of two sources into motions of a single receiver comprising; a pair of driving members connectible to said sources respectively; said members having a common pivotal axis; a link connected to one end of one of said members, an arm having the receiver at one end linked to the ends of the other of said members and said link; said members on one side of said axis, said link, and the portion of said arm between the ends of the other of said members and said link forming a parallelogram; and a counterbalancing weight on said arm beyond the pivot thereto of one of said members from said receiver; said weight having a mass whereby the torque resulting from mass reaction forces, exerted on one of said members when a torque is applied solely to the other of said member by the source connected thereto, is substantially balanced out.

7. A linkage system for translating the motions of two sources into motions of a single receiver comprising, a pair of driving members connectible to said sources, said members having a common pivotal axis, links connected between said pair of members and said receiver, portions of members and portions of said links forming essentially a parallelogram, said links having masses whereby the torque resulting from mass reaction forces exerted on one of said members when a torque is applied solely to the other one of said members, is rendered substantially zero.

8. In a tele-autographic receiver wherein the motions of receiving motors are translated into writing by a receiving stylus mechanism, a linkage system between said stylus and said motors comprising; a pair of driving members connectible to said motors; said members having a common pivotal axis; links connected between said pair of members and said stylus, portions of said driving members and portions of said links forming essentially a parallelogram; a counterbalancing mass on said linkage system; whereby, the mass thereof, the masses of said linkage system, said stylus mechanism, and the coordinates thereof as defined by said parallelogram follow the law $\Sigma MXY=0$.

9. In a tele-autographic receiver wherein the motions of receiving motors are translated into writing by a receiving stylus mechanism, a linkage system between said stylus and said motors comprising; a pair of driving members connectible to said motors; said members having a common pivotal axis; links connected between said pair of members and said stylus, portions of said driving members and portions of said links forming essentially a parallelogram; said links having masses whereby the torque resulting from mass reaction forces exerted on one of said members when a torque is applied solely to the other one of said members, is rendered substantially zero.

10. In a follow-up system wherein the motions of a pair of follow-up members are combined into the single motion of a receiver, the apparatus comprising, means for controlling the motions of each of said pair of follow-up members in accordance with the second time derivative of the transmitted positioning signal and a linkage between said receiver and said follow-up members, said linkage having substantially zero moment of mutual inertia between said pair of follow-up members.

11. A follow-up system comprising, a transmitting member whose motion is resolved into two components, means for transmitting signals corresponding to each of said components, a receiving member for duplicating the motions of said transmitting member, a pair of driving arms on a common pivot axis, linkage mechanism having zero moment of mutual inertia between said two arms for driving said receiving member, and means for driving each one of said pair of arms in accordance with the second time derivative of the corresponding transmitted signal.

12. A follow-up system comprising, a transmitting member whose motion is resolved into two components, means for transmitting signals corresponding to each of said components, a receiving member for duplicating the motions of said transmitting member, a pair of driving arms on a common pivot axis, linkage mechanism having zero moment of mutual inertia between said two arms for driving said receiving member, means for driving each one of said pair of arms in accordance with the second time derivative of the corresponding transmitted signal, and further means for correcting the position of each of said pair of arms in accordance with each of said signals.

13. A follow-up system comprising, a transmitting member whose motion is resolved into two components, means for transmitting positioning signals corresponding to each of said components, a receiving member for duplicating the motion of said transmitting member, a pair of driving arms on a common pivot axis, a parallelogram linkage mechanism having zero moment of mutual inertia between said two arms, means for driving each one of said pair of arms in accordance with the second time derivative of the corresponding transmitted signal, and further means for correcting the position of each of said pair of arms in accordance with each of said signals.

ROBERT ADLER.

REFERENCES CITED

The following references are of record in the file of this patent:

UNITED STATES PATENTS

| Number | Name | Date |
|---|---|---|
| 2,141,388 | Harrison et al. | Dec. 27, 1938 |
| 2,274,638 | Rosene | Mar. 3, 1942 |
| 2,284,795 | Belaef | June 2, 1942 |
| 2,459,253 | Tyrner | Jan. 18, 1949 |